Patented Apr. 17, 1928.

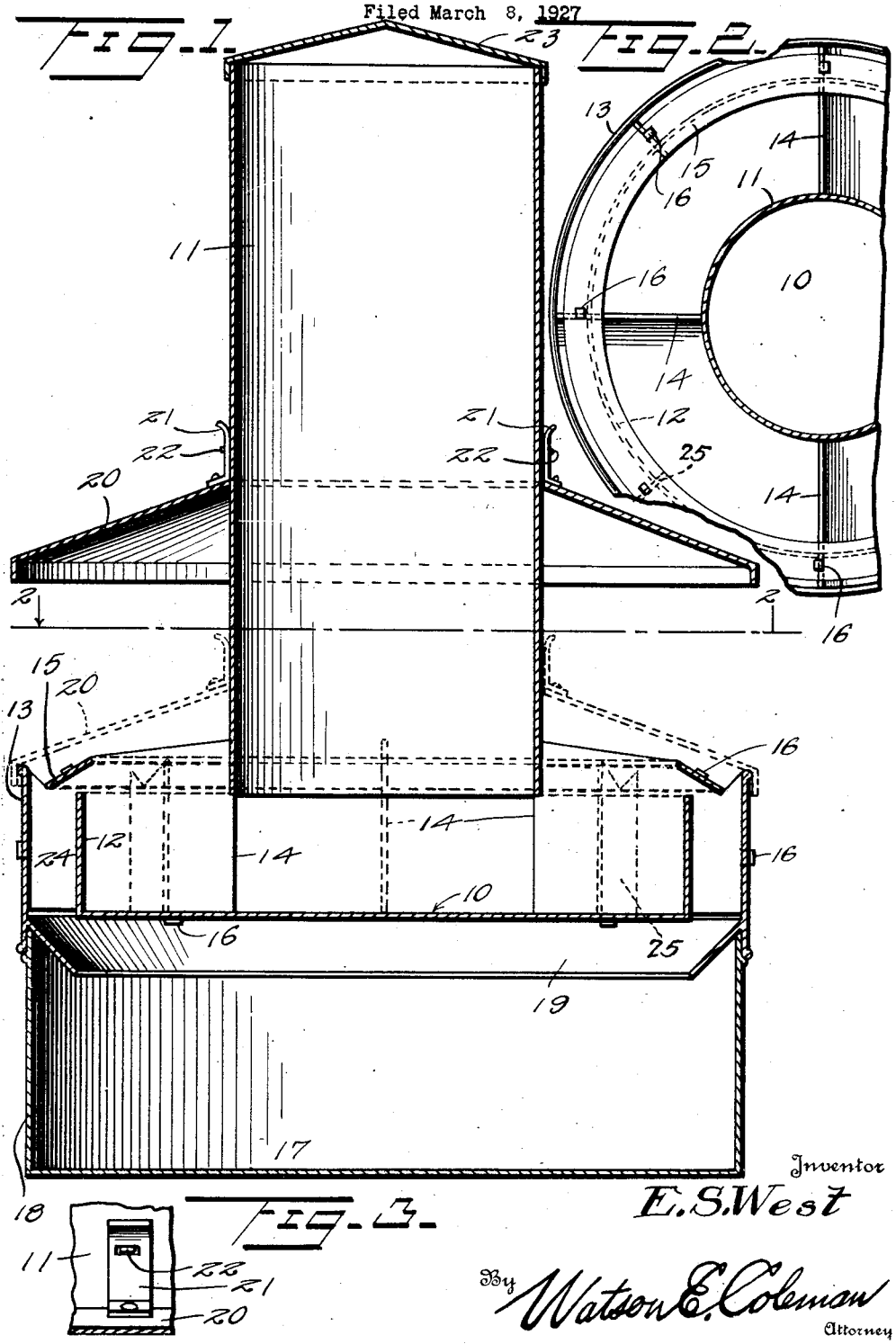

1,666,322

UNITED STATES PATENT OFFICE.

ELMER S. WEST, MAYSLICK, KENTUCKY.

POULTRY FEEDER.

Application filed March 8, 1927. Serial No. 173,713.

This invention relates to poultry feeders and has for its primary object the production of a device of this character, which is so constructed that the waste of feed by the fowls is prevented.

A further object of the invention is to provide a device of this character having a collecting base into which the major portion of feed thrown from the hopper sections by the fowls in seeking for choice morsels among the feed in the hopper will be deflected and stored.

A further object of the invention is to provide a device of this character wherein the collecting base serves as a support, elevating the hopper to the proper height to prevent litter being thrown thereinto by the fowls and the base is removable, so that the collected feed may be readily returned to the hopper.

A still further object of the invention is to provide means for distributing the feed delivered to the collecting base, so that it will not pile up and obstruct the entrance of further feed thereto.

A further object of the invention is to provide a device of this character which has a protecting hood, preventing defiling of the contents thereof which may be moved to a position preventing access to the hopper either by the fowls or by rodents.

These and other objects I attain by the construction shown in the accompanying drawings, wherein for the purpose of il35 lustration is shown a preferred embodiment of my invention and wherein:—

Figure 1 is a vertical sectional view through a poultry feeder constructed in accordance with my invention, the sealing flange being indicated in the dotted position.

Figure 2 is a fragmentary section taken through the hopper on the line 2—2 of Figure 1;

Figure 3 is a detail view showing the manner of retaining the sealing flange in elevated position.

Referring now more particularly to the drawings, the feeder structure includes a circular hopper pan 10 and a hopper 11 as50 sociated therewith, which is preferably likewise circular and of less diameter than the pan 10. Arranged outwardly of the side wall 12 of the hopper pan and concentric with this outer wall is a false pan wall 13, the lower end of which preferably extends slightly below the lower surface of the pan bottom. Secured to the lower end of the wall of the hopper, the pan 10 and false pan wall 13 are radially extending partitions 14, which extend through slots formed in the side wall 12 of the pan. These partitions hold the hopper pan and false pan wall in adjusted relation and maintain the bottom edge of the wall of the hopper in spaced relation to the bottom of the pan, so that feed introduced to the hopper may pass into the space between the outer face of the wall of the hopper and the wall 12 of the pan. These partition walls likewise serve as a means for supporting and securing in position a frustro-conical deflector ring 15, which overlies the upper edge of the outer wall 12 in spaced relation thereto and has its upper edge arranged above the level of the upper edge of the outer false wall, which extends slightly above the level of the pan wall 12, and its lower outer edge arranged below the level of this outer wall. As at present disclosed, the means for securing the partitions 14 to the remaining elements comprises tabs 16 formed on the edges of the partitions against which these elements abut and extended through slots formed in the elements and then bent. Any other suitable means may, however, be employed for making the necessary connections.

The numeral 17 designates a collecting base in the form of a pan, the side walls 18 of which telescopically interiorly engage the lower end of the outer false wall 13. Adjacent its lower end, the outer false wall 13 has secured thereto at the inner face thereof the larger or base edge of a frustro-conical deflector flange 19 against which the wall 18 engages to limit downward movement of the outer false wall and accordingly of the hopper structure into the collecting base. The numeral 20 designates a frusto-conical hood slidable upon the hopper 11 from a point intermediate the ends thereof to a point where its outer edge rests upon the upper edge of the outer false wall 13. In its elevated position, this hood is releasably held in position by means of spring catches 21, which engage lugs 22 carried by the walls of the hopper 11. The hopper 11 is provided with a removable, preferably conical cap 23, the removal of which permits insertion of feed to the hopper.

In the use of the device, the major portion of the feed flirted from the hopper sections provided by the radial partitions engage against the under surface of the deflecting ring 15 and be directed thereby into the annular space 24 between the wall 12 and the outer false wall 13. Through this space, it will fall against the deflector flange 19 and be directed thereby against the center of the collecting base 17. It is pointed out that the flange 19, by deflecting this feed toward the center of this base, permits a considerably increased quantity of feed to be collected in the base before the base can be emptied. The feed generally placed in these hoppers is what is known as mash and consists of a ground mixture of food stuffs, the particles of which are very light and have a tendency to cling to one another. If the feed were permitted to drop straight to the bottom of the base 17, it would soon pile up until it tended to close the bottom of the space 24 and thus render the base inoperative for the collection of further feed. These particles of feed thrown over the upper inner edge of the ring, unless given a considerable impulse, will fall upon the upper surface of this ring and pass between the outer edge of the ring and the wall 13 into the space 24. When the hopper is not in use, and at night, the hood 20 may be dropped to the position indicated in dotted lines in Figure 1, at which time, it serves to seal the hopper and prevent access of rodents or of the fowls thereto.

The hood 20 further serves to assist in the prevention of defiling of the contents of the hopper and this is further assisted by the conical cap 23 employed at the upper end of the hopper, which affords no surface upon which a fowl may roost. The base 17 can be made of desired depth and will maintain the feeding sections of the hopper at such a height that the entrance of litter thereto is prevented, without the necessity of providing a special base therefor. Additional supports 25 for the deflector ring 15 are provided, these supports being arranged intermediate the partitions 14.

Since the construction hereinbefore set forth is capable of a certain range of change and modification without materially departing from the spirit of the invention, I do not limit myself to such specific structure except as hereinafter claimed.

I claim:—

1. In a poultry feeder, the combination with a structure including a hopper, a pan into which the hopper discharges, a wall surrounding the outer pan wall in spaced relation thereto, of a collecting base supporting said structure and with which the space between said wall and the pan wall communicates and means upon said wall deflecting material passing downwardly through said space toward the center of the collecting base, the collecting base telescopically interiorly engaging said wall, said means likewise constituting a stop limiting downward movement of the wall upon the base.

2. In a poultry feeder, the combination with a structure including a hopper, a pan into which the hopper discharges, a wall surrounding the outer pan wall in spaced relation thereto, of a collecting base supporting said structure and with which the space between said wall and the pan wall communicates, and a deflector ring included in said structure and overlying the upper surface of the pan wall in spaced relation thereto and deflecting materials impinging thereagainst downwardly and outwardly into the space between said walls.

3. In a poultry feeder, the combination with a structure including a hopper, a pan into which the hopper discharges, a wall surrounding the outer pan wall in spaced relation thereto, of a collecting base supporting said structure and with which the space between said wall and the pan wall communicates, a deflector ring included in said structure and overlying the upper surface of the pan wall in spaced relation thereto and deflecting materials impinging thereagainst into the space between said walls, and means upon said wall deflecting material passing downwardly through said space toward the center of the collecting base.

4. In a poultry feeder, the combination with a structure including a hopper, a pan into which the hopper discharges, a wall surrounding the outer pan wall in spaced relation thereto, of a collecting base supporting said structure and with which the space between said wall and the pan wall communicates, a deflector ring included in said structure and overlying the upper surface of the pan wall in spaced relation thereto and deflecting materials impinging thereagainst into the space between said walls, and means upon said wall deflecting material passing downwardly through said space toward the center of the collecting base, the collecting base telescopically interiorly engaging said wall, said means likewise constituting a stop limiting downward movement of the wall upon the base.

5. In a poultry feeder, the combination with a structure including a hopper, a pan into which the hopper discharges, a wall surrounding the outer pan wall in spaced relation thereto, of a collecting base supporting said structure and with which the space between said wall and the pan wall communicates, a deflector ring included in said structure and overlying the upper surface of the pan wall in spaced relation thereto and deflecting materials impinging thereagainst into the space between said walls, and radially extending partitions within said pan securing the pan, the hopper, the outer wall and the deflector ring to one another.

In testimony whereof I hereunto affix my signature.

ELMER S. WEST.